US012783683B2

(12) United States Patent
Jeevagunta et al.

(10) Patent No.: US 12,783,683 B2
(45) Date of Patent: Nov. 3, 2026

(54) APPLICATION PROGRAMMING INTERFACE (API) ATTACK SURFACE DISCOVERY USING CLOUD SECURITY POSTURE MANAGEMENT (CSPM)

(71) Applicant: Cequence Security, Inc., Sunnyvale, CA (US)

(72) Inventors: Abraham Jeevagunta, San Jose, CA (US); Shreyans Mehta, Los Altos, CA (US); Subramanian Iyer, Fremont, CA (US); Ravindran Harigopan Nair, Santa Clara, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 76 days.

(21) Appl. No.: 18/734,590

(22) Filed: Jun. 5, 2024

(65) Prior Publication Data

US 2024/0403444 A1 Dec. 5, 2024

Related U.S. Application Data

(60) Provisional application No. 63/506,216, filed on Jun. 5, 2023.

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 2221/033* (2013.01)

(58) Field of Classification Search
CPC . G06F 21/577; G06F 21/552; G06F 2221/033
See application file for complete search history.

(56) References Cited

U.S. PATENT DOCUMENTS

| | | | | |
|---|---|---|---|---|
| 10,331,677 | B1 * | 6/2019 | Horowitz | G06F 16/24575 |
| 11,528,257 | B1 * | 12/2022 | Sanchez Rola | H04L 67/146 |
| 2020/0379879 | A1 * | 12/2020 | Plotnik | B62H 5/142 |
| 2022/0060398 | A1 * | 2/2022 | Shishir | G06F 11/0754 |
| 2023/0161651 | A1 * | 5/2023 | Duplys | G06F 9/547 726/22 |
| 2023/0259612 | A1 * | 8/2023 | Bhary | G06F 21/552 726/22 |
| 2023/0396643 | A1 * | 12/2023 | Petefish | H04L 63/1433 |
| 2024/0031664 | A1 * | 1/2024 | Morgan | G08B 25/10 |
| 2024/0134979 | A1 * | 4/2024 | Kravtsov | G06F 21/577 |
| 2024/0275842 | A1 * | 8/2024 | Cooney | H04L 63/0807 |

* cited by examiner

*Primary Examiner* — Linglan Edwards
*Assistant Examiner* — Jacob Benedict Knackstedt

(57) ABSTRACT

Various embodiments include a system that discovers hidden Application Programming Interfaces (APIs) and detects security vulnerabilities in the hidden APIs. The system accesses Cloud Security Posture Management (CSPM) logs and discovers APIs based on the logs. The system identifies additional APIs that are not present in the CSPM logs. The system initiates API calls using modified addresses for the discovered APIs to discover hidden APIs. The system tests the discovered APIs to determine attack surfaces in the discovered APIs. The system generates a report that identifies the discovered APIs and that indicates the attack surfaces.

20 Claims, 6 Drawing Sheets

APPLICATION PROGRAMMING INTERFACE (API) ATTACK SURFACE DISCOVERY USING CLOUD SECURITY POSTURE MANAGEMENT (CSPM)

CROSS-REFERENCE TO RELATED APPLICATIONS

This U.S. Patent Application claims the benefit of and priority to U.S. Provisional Patent Application 63/506,216 titled, "Application Programming Interface (API) Attack Surface Discovery Using Cloud Security Posture Management (CSPM)" which was filed on Jun. 5, 2023, and which is hereby incorporated by reference into this U.S. Patent Application in its entirety.

TECHNICAL FIELD

Various embodiments of the present technology relate to Application Programming Interface (API) security, and more specifically, to discovering APIs and detecting security vulnerabilities in the APIs.

BACKGROUND

The security of a web service is of upmost importance to both the operators of the website and its users. As more people utilize the Internet to communicate and conduct business transactions and other services, more threats to website security arise. Website owners, insurers, hosting services, and others involved in the provision of a web service typically strive to create a robust security infrastructure for a website to prevent nefarious individuals from compromising the site. However, despite these security precautions, a website could still be subject to intrusions by computer hackers, malware, viruses, and other malicious attacks. Websites may be vulnerable to security breaches for a variety of reasons, including security loopholes, direct attacks by malicious individuals or software applications, dependencies on compromised third-party providers, and other security threats. Security systems are employed by websites to counteract the wide range of threats.

Many web applications utilize Application Programming Interfaces (APIs) based applications for functions like sales productivity, collaboration, marketing automation, and project tracking. API usage has increased as organizations have expanded their use of microservices and created new cloud-native applications. The consumer facing applications that the organizations create are often API based. Additionally, most internet traffic today is API driven. This API ecosystem is fueled by increases in public cloud environments, Kubernetes environments, serverless environments, and use of third-party Software As A Service (SaaS) systems. Developers can now roll out new API driven services in any environment. Critical information like personal information, financial information, health information, and the like is stored behind the applications that host these APIs. Malicious actors utilize these APIs as entry points to exfiltrate this information. However, it is difficult for security systems to counter malicious actors given the large and increasing number of APIs. Without knowledge of the existence of an API, a security system cannot effectively defend that API against malicious actors. Unfortunately, API security systems do not effectively and efficiently identify APIs in an organization's API ecosystem.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for Application Programming Interfaces (APIs). Some embodiments comprise a method to discover hidden APIs and detect security vulnerabilities in the hidden APIs. The method comprises accessing Cloud Security Posture Management (CSPM) logs. The method further comprises discovering APIs based on the CSPM logs. The method further comprises identifying additional APIs that are not present in the CSPM logs. The method further comprises making API calls using modified addresses for the APIs and the additional APIs to discover hidden APIs. The method further comprises testing discovered APIs to determine attack surfaces, wherein the discovered APIs comprise the APIs, the additional APIs, and the hidden APIs. The method further comprises generating a report that identifies the discovered APIs and that indicates the attack surfaces.

Some embodiments comprise a system to discover hidden APIs and detect security vulnerabilities in the hidden APIs. The system comprises a CSPM discovery agent, an API log analyzer, and an attack surface discovery module. The CSPM discovery agent accesses CSPM logs. The API log analyzer discovers APIs based on the CSPM logs. The API log analyzer identifies additional APIs that are not present in the CSPM logs. The API log analyzer initiates API calls using modified addresses for the APIs and the additional APIs to discover hidden APIs. The attack surface discovery module tests the discovered APIs to determine attack surfaces in the discovered APIs, wherein the discovered APIs comprise the APIs, the additional APIs, and the hidden APIs.

Some embodiments comprise one of more non-transitory computer readable storage media having program instructions stored thereon to discover hidden APIs and detect security vulnerabilities in the hidden APIs. When executed by a computing system, the program instructions direct the computing system to perform operations. The operations comprise accessing Cloud Security Posture Management (CSPM) logs. The operations further comprise discovering APIs based on the CSPM logs. The operations further comprise identifying additional APIs that are not present in the CSPM logs. The operations further comprise making API calls using modified addresses for the APIs and the additional APIs to discover the hidden APIs. The operations further comprise testing discovered APIs to determine attack surfaces, wherein the discovered APIs comprise the APIs, the additional APIs, and the hidden APIs.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
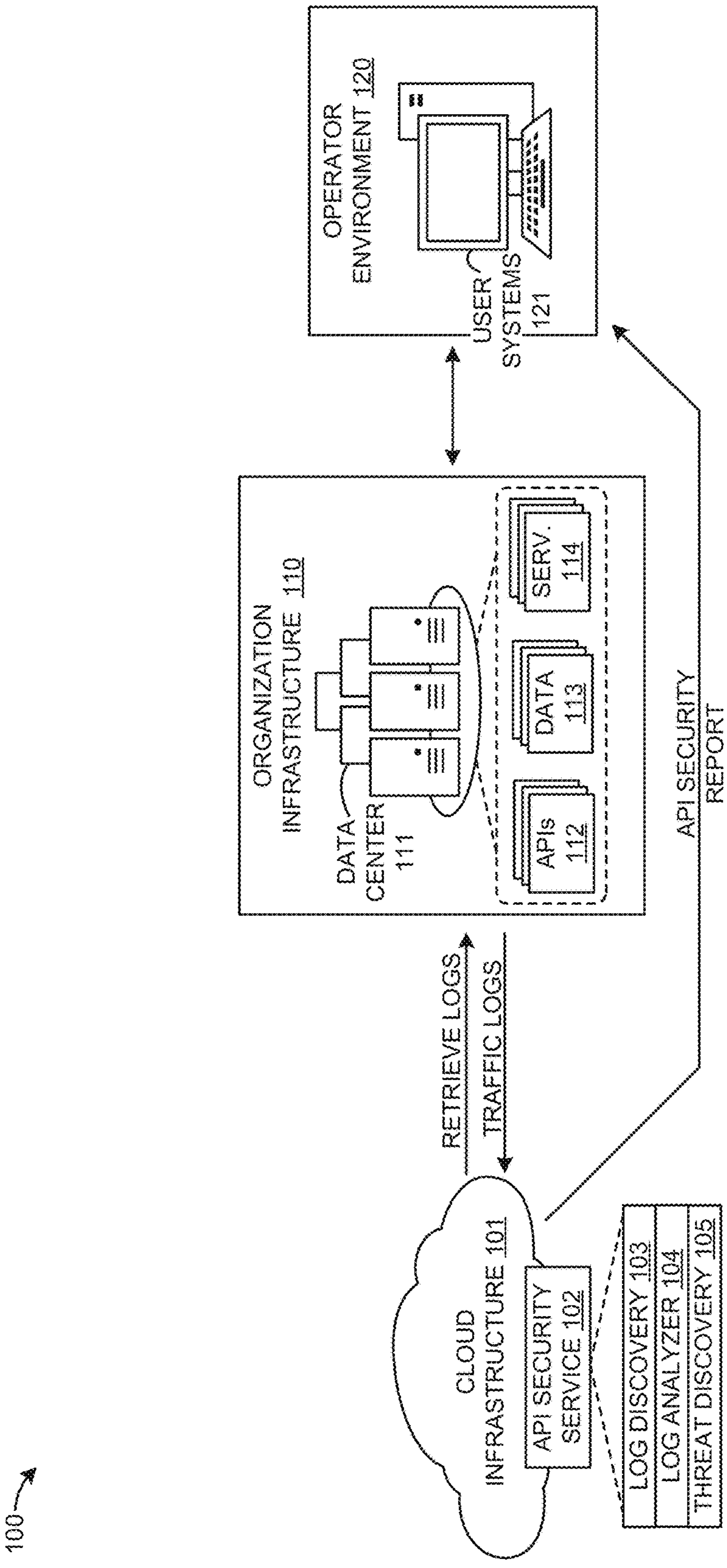
FIG. 1 illustrates an exemplary system to discover Application Programming Interfaces (APIs) and detect security vulnerabilities in the APIs.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication network 100 discover Application Programming Interfaces (APIs) and detect security vulnerabilities in the APIs. Communication network 100 provides services like online networking, content distribution, web application services, web application security, and the like. Communication network 100 comprises cloud infrastructure 101, organization infrastructure 110, and operator environment 120. Cloud infrastructure 101 hosts an API security service that comprises log discovery module 103, log analyzer module 104, and threat discovery module 105. Organization infrastructure 110 comprises date center 111. Data center 111 is representative of one or more computing systems that comprise APIs 112, store data 113, and provide services 114. Operator environment 120 comprises user systems 121. Operator environment 120 is representative of an interface to organization infrastructure 110 that allows operators to interact with the various computing systems and software that compose data center 111. For example, an organization operator may push a new API to production via user systems 121. In other examples, communication network 100 may include fewer or additional components than those illustrated in FIG. 1. Likewise, the illustrated components of communication network 100 may include fewer or additional components, assets, or connections than shown. Each of cloud infrastructure 101, organization infrastructure 110, and operator environment 120 may be representative of a single computing apparatus or multiple computing apparatuses.

Various examples of network operation and configuration are described herein. In some examples, API security service 102 is representative of a serverless API security and discovery service hosted on cloud infrastructure 101 to utilize CSPM logs to discover all APIs present in an organization and detect security vulnerabilities in the discovered APIs. Due to the size and complexity of many enterprise systems, it is difficult for the organization's operators to track every active API present in the organization. For example, a portion of APIs 112 may comprise hidden APIs which lack a documented presence in organization infrastructure 110. This often occurs during API development when APIs that should be deactivated (e.g., a beta version) are accidentally kept active. The hidden APIs of APIs 112 provide access points for malicious actors due to them not being monitored since their presence is unknown and to inherent faults that exist in APIs 112. Possible security vulnerabilities present in APIs 112 include accepting fraudulent user credentials, providing access to resources that should be non-accessible, providing unintended functionality, and the like. To combat these security issues, API security service 102 implements an API discovery process that identifies APIs 112 based on the traffic logs stored by data center 111. An organizations traffic logs provide a picture of how information moves throughout organization infrastructure 110. By retrieving and processing log data associated with API gateways, load balances, and API access logs, security service 102 can efficiently discover APIs 112 without first needing to deploy software in organization 110.

Security service 102 is hosted on cloud infrastructure 101. Cloud infrastructure 101 may comprise servers, cloud computing systems, or any other computing system, network equipment, apparatus, system, or systems that may connect to another computing system over a communication network. Cloud infrastructure 101 comprises processing systems and communication transceivers. Cloud infrastructure 101 may also include other components such as a router, server, data storage system, and power supply. Cloud infrastructure 101 may reside in a single device or may be distributed across multiple devices. Cloud infrastructure 101 may be a discrete system or may be integrated within other systems, including other systems within communication network 100. Some examples of cloud infrastructure 101 include database systems, desktop computers, server computers, cloud computing platforms, and virtual machines, as well as any other type of computing system, variation, or combination thereof.

Security service 102 may control the execution of modules 103-105 to gather traffic logs from data center 111 to discover APIs 112 based on the gathered contextual information. Log discovery module 103 obtains relevant traffic logs from data center 111. For example, log discovery module 103 may retrieve CSPM logs to identify ones of APIs 112 mentioned in the CSPM logs. The CSPM logs indicate historic API calls to ones of APIs 112. Log analyzer module 104 processes the retrieved traffic logs to discover ones of APIs 112 that are explicitly mentioned in the retrieved logs. Log analyzer module 104 may discover additional ones of APIs 112 not explicitly mentioned in the logs based on the discovered explicitly mentioned ones of APIs 112. For example, log analyzer 104 may determine API endpoints and paths for unmentioned ones of APIs 112 based on commonly used API endpoints in publicly available open API specifications associated with organization 110. Log analyzer 104 may identify ancillary endpoints that typically exist with these APIs even though they are not documented in API specifications. Examples of ancillary endpoints include /api/health, /api/version, /api/metrics, and the like. Log analyzer 104 additionally discovers hidden ones of APIs 112 by making, initiating, transferring, or otherwise delivering modified API calls for APIs not mentioned in the retrieved logs or documented in the open API specifications. Log analyzer 104 generates the modified API calls based on the identified API endpoints. Log analyzer 104 discovers hidden ones of APIs 112 when it receives responses from the modified API calls. Threat discovery module 105 interrogates the discovered APIs (e.g., the logged APIs, documented APIs, undocumented APIs, and hidden APIs) to detect any security vulnerabilities present in the APIs 112. Threat discovery module 105 determines traffic patterns to/from APIs 112, accesses API specifications for APIs 112, and determines user credentials for APIs 112 to detect security threats to APIs 112. Threat discovery 105 may implement API tests based on the normal operating behavior of APIs 112 to drive APIs 112 to perform unauthorized actions. For example, one of APIs 112 may be configured to receive GET requests and provide resources in response to the GET requests. The API test may modify the GET request to a DELETE request to attempt to drive API to delete the resource. Threat discovery 105 generates an API security report that inventories the discovered APIs and indicates and discovered API threats. API security service 102 transfers the security report for delivery to operator environment 120. User systems 121 renders the security report for review by an organization operator which can then implement a preventative action.

Data center 110 is representative of an enterprise computing system that comprises a processing system and communication transceiver. Data center 110 may also include other components like a user interface, data storage system, and power supply. Examples of data center 110 may include server computers and data storage devices deployed on-premises, in the cloud, in a hybrid cloud, or elsewhere, by service providers such as enterprises, organizations, individuals, and the like. Data center 110 may rely on the physical connections provided by one or more other network providers such as transit network providers, Internet backbone providers, and the like to communicate with and provide services 114 to external systems. Data 113 may comprise user data, system data, traffic logs and the like. Data 113 may comprise CSPM log data that indicates the presence of APIs 112. In some examples, the computing systems of data center 110 could comprise a web server, Content Distribution Network (CDN), reverse proxy, load balancer, middleware, cloud server, network switch, router, switching system, packet gateway, network gateway system, Internet access node, application server, database system, service node, firewall, or some other communication system, including combinations thereof. The computing system of data center 110 may reside in a single device or may be distributed across multiple devices and may be a discrete system or could be integrated within other systems, including other systems within communication network 100.

Data center 111 comprises APIs 112. APIs 112 are representative of a set of API servers, computing systems, and/or network equipment configured to provide services and web resources to a client. For example, APIs 112 may comprise a system that provides a cloud-based web service to a user. APIs 112 may comprise client-side APIs and server-side APIs. APIs 112 may be representative of any computing apparatus, system, or systems that may connect to another computing system over a communication network. APIs 112 comprise a processing system and communication transceiver. APIs 112 may also include other components such as routers, data storage systems, and power supplies. APIs 112 may reside in a single device or may be distributed across multiple devices. APIs 112 may comprise discrete systems or may be integrated within other systems, including other systems within communication network 100. Some examples of computing systems that host APIs 112 include database systems, server computers, cloud computing platforms, and virtual machines, as well as any other type of computing system, variation, or combination thereof. The API servers can be in various different environments-cloud, Kubernetes, serverless, data center, and the like. The actual API server name then points to these environments.

User systems 121 resides in operator environment 120 and is representative of a computing system that comprises a processing system and communication transceiver. User systems 121 allows organization operators to interact with the computing systems that comprise data center 111. User systems 121 may include other components like a user interface, data storage system, and power supply. Examples of user systems 121 include mobile computing devices, such as cell phones, tablet computers, laptop computers, notebook computers, and gaming devices, as well as any other type of mobile computing devices and any combination or variation thereof. Examples of user systems 121 also include desktop computers, server computers, and virtual machines, as well as any other type of computing system, variation, or combination thereof. The computing system of user systems 121 may reside in a single device or may be distributed across multiple devices and may be a discrete system or could be integrated within other systems, including other systems within communication network 100.

Cloud infrastructure 101, organization infrastructure 110, and operator environment 120 communicate over communication systems like routers, gateways, telecommunication switches, servers, processing systems, or other communication equipment and systems for providing communication and data services. The communication systems could comprise wireless communication nodes, telephony switches, Internet routers, network gateways, computer systems, communication links, or some other type of communication equipment, including combinations thereof. The communication systems may also comprise optical networks, packet networks, wireless networks, local area networks (LAN), metropolitan area networks (MAN), wide area networks (WAN), or other network topologies, equipment, or systems, including combinations thereof. Clod infrastructure 101, organization infrastructure 110, and operator environment 120 may communicate over wired or wireless communication links. The communication systems may use Internet Protocol (IP), Institute of Electrical and Electron Engineers (IEEE) 802.11 (WiFi), IEEE 802.3 (Ethernet), optical networking, wireless protocols, communication signaling, or some other communication format, including combinations thereof.

Cloud infrastructure 101, organization infrastructure 110, and operator environment 120 comprise microprocessors, software, memories, transceivers, bus circuitry, and the like. The microprocessors comprise Central Processing Units (CPU), Graphical Processing Units (GPU), Application-Specific Integrated Circuits (ASIC), Field Programmable Gate Array (FPGA), and/or types of processing circuitry. The memories comprise Random Access Memory (RAM), flash circuitry, disk drives, and/or the like. The memories store software like operating systems, security modules, user applications, web applications, and browser applications. The microprocessors retrieve the software from the memories and execute the software to drive the operation of communication network 100 as described herein. The communication links that connect the elements of communication network 100 use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), virtual switching, inter-processor communication, bus interfaces, and/or some other data communication protocols.

Figure 2:
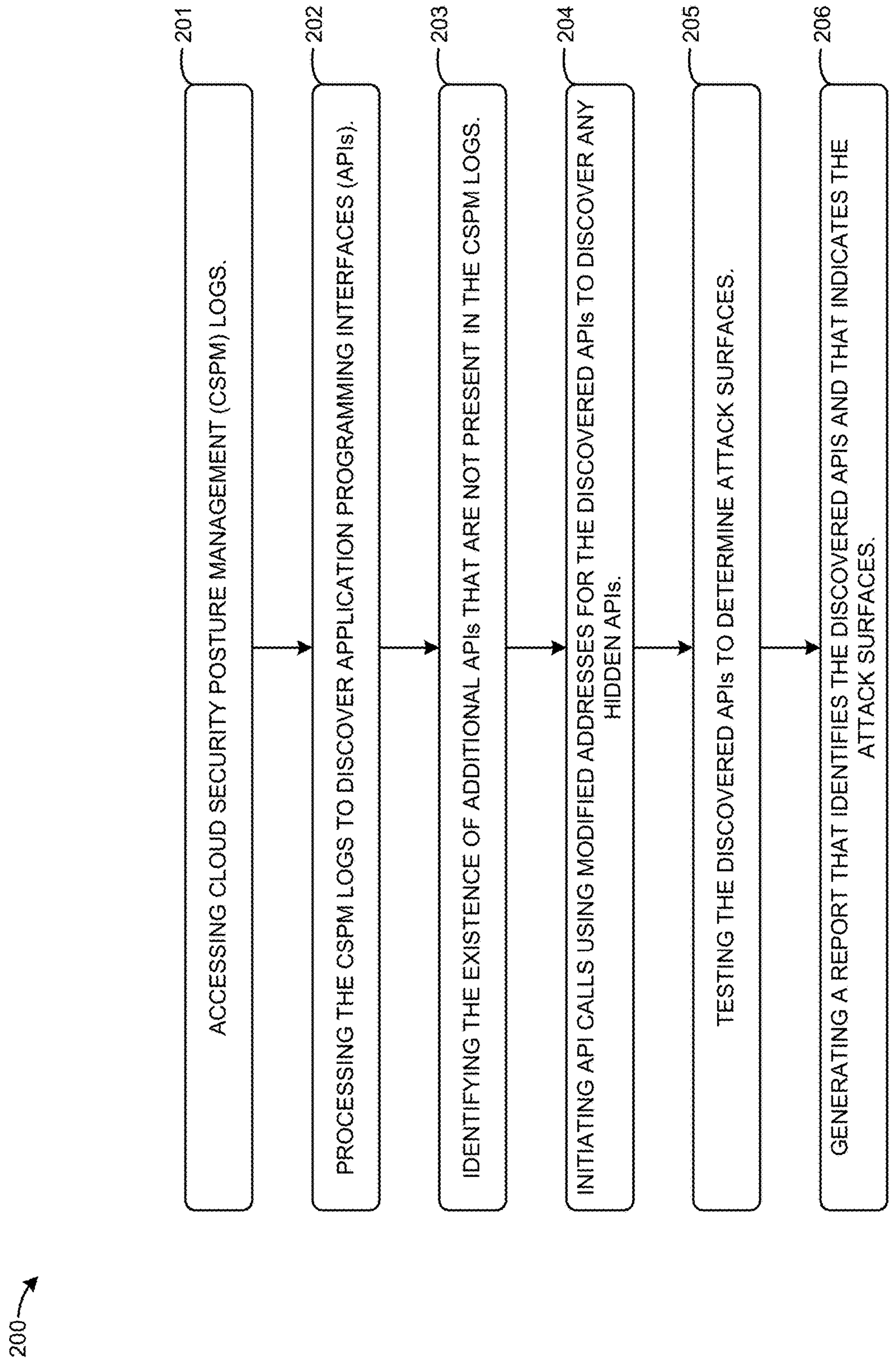
FIG. 2 illustrates an exemplary operation of the system to discover APIs and detect security vulnerabilities in the APIs.
Figure 3:
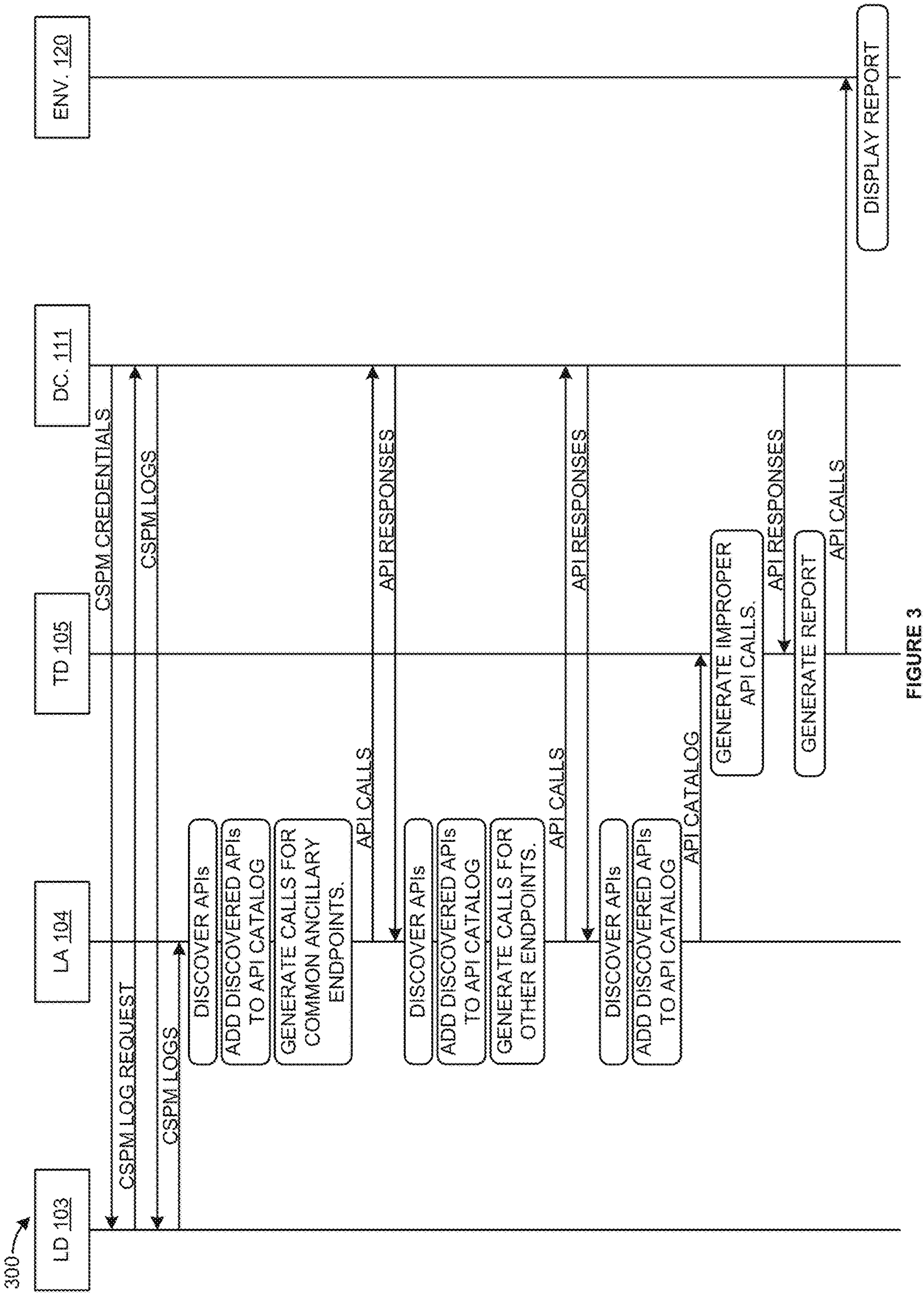
FIG. 3 illustrates another exemplary operation of the system to discover APIs and detect security vulnerabilities in the APIs.

In some examples, communication network 100 implements process 200 illustrated in FIG. 2 and/or process 300 illustrated in FIG. 3. It should be appreciated that the structure and operation of communication network 100 may differ in other examples. Process 200 and/or 300 may be implemented in program instructions in the context of any of the software applications, module components, or other such elements of one or more computing devices of network 100. The program instructions direct the computing devices(s) to operate as described with respect to FIG. 2 and/or FIG. 3.

FIG. 2 illustrates process 200. Process 200 comprises an exemplary operation of communication network 100 to discover API attack vectors based on CSPM. The operation may vary in other examples. The operations of process 200 comprise accessing CSPM logs (step 201). The operations further comprise processing the CSPM logs to discover APIs (step 202). The operations further comprise inferring the existence of additional APIs that are not present in the CSPM logs based on the discovered APIs (step 203). The operations further comprise transferring API calls using modified addresses for the discovered APIs to discover any hidden APIs (step 204). The operations further comprise testing the discovered APIs to determine attack surfaces (step 205). The operations further comprise generating a report that identifies the discovered APIs and that indicates the attack surfaces (step 206).

FIG. 3 illustrates process 300. Process 300 comprises an exemplary operation of wireless communication network 100 to discover API attack vectors based on CSPM. Process 300 comprises an example of process 200 illustrated in FIG. 2, however process 200 may differ. The operation may vary in other examples. In some examples, data center (DC) 111 provides CSPM access credentials to security service 102. The access credentials authorize security service 102 to access CSPM log data for organization 110 without needing to deploy software to data center 111 to monitor API traffic directly. Log discovery module (LD) 103 transfers a CSPM log request to data center 111 that includes the access credentials to retrieve CSPM log data from data center 111. Data center 111 validates the credentials and returns the requested CSPM logs to log discovery module 103. For example, log discovery 103 may retrieve CSPM logs associated with API gateways, application load balancers, and API access logs. Log discovery 103 indicates the retrieved CSPM logs to log analyzer (LA) 104. Log analyzer 104 processes the retrieved CSPM logs to discover ones of APIs 112 mentioned in the access logs. For example, the CSPM logs may document API calls to ones of APIs 112 and log analyzer 104 may discover APIs based on the calls. Log analyzer 104 may identify endpoints, access methods, request types, response types, and the like for APIs 112. Log analyzer 104 adds the discovered ones of APIs 112 to an API catalog.

Log analyzer 104 utilizes heuristics and/or machine learning techniques to identify additional ones of APIs 112 not mentioned in the CSPM traffic logs. Log analyzer 104 may discover ancillary API endpoints and paths for these additional ones of APIs 112 based on commonly used API endpoints in publicly available open API specifications like /api/health, /api/version, /api/metrics, and the like. Log analyzer 104 pings these ancillary endpoints to confirm the existence of additional ones of APIs 112. For example, log analyzer 104 may generate API calls, address the calls for API endpoints identified in the API specifications, and transfer the API calls to data center 111. Data center 111 then routes or otherwise delivers these calls to corresponding ones of APIs 112 that are extant within infrastructure 110. Log analyzer 104 adds these additional APIs to the API catalog. Log analyzer 104 generates modified API calls based on the already identified ones of APIs 112 to discover the existence of any hidden APIs. For example, log analyzer 104 may fuzz/alter conventional API calls to APIs 112 to uncover hidden APIs that are not present in the CSPM logs or mentioned in the open API specifications. Log analyzer 104 crawls the discovered and extrapolated APIs to verify their presence in organization infrastructure 110 and adds the hidden ones of APIs 112 to the API catalog. Log analyzer indicates the API catalog to threat detection module (TD) 105.

Threat detection module 105 interrogates the discovered APIs to identify security vulnerabilities in organization infrastructure 110. Threat detection module 105 generates API tests for the discovered APIs. The API tests comprise improper API requests to attempt to cause the APIs to perform unauthorized and/or unwanted behavior. For example, typical API requests received by one of the discovered APIs may include request types, accessible API endpoints, security keys used to access the API, and fields included in the request. Threat detection module 105 generates API test requests that comprise attributes not present in the normal requests received by the API. These attributes may comprise additional fields, request types not fielded by the API, addressed for non-accessible endpoints, modified keys, and the like. For example, one of APIs 112 may be configured to accept API calls that include a valid key and module 105 may generate and transfer a test API call to the API that includes previously a valid key to determine if the API will accept the invalid key.

Threat detection module 105 further monitors requests to and responses from APIs 112 to detect anomalous API behavior, improper credentials, suspicious requests, or other types of API threat signatures. Threat detection module 105 generates a threat detection report based on the test results. The report catalogs all of the discovered APIs as well as any detected security vulnerabilities in APIs 112. Security service 102 transfers the threat detection report to operator environment 120. Security service 102 periodically repeats the above process (e.g., based on an operator defined schedule) to keep the API catalog up-to-date and to uncover any new security vulnerabilities.

Advantageously, security service 102 effectively and efficiently identifies APIs 112 present in organization infrastructure 110. Moreover, security service 102 discovers APIs 112 without needing to first deploy software to organization infrastructure 110 by retrieving CSPM log data. Furthermore, security service 102 identifies security vulnerabilities in APIs 112 which facilitates API threat detection and prevention by network operators.

Figure 4:
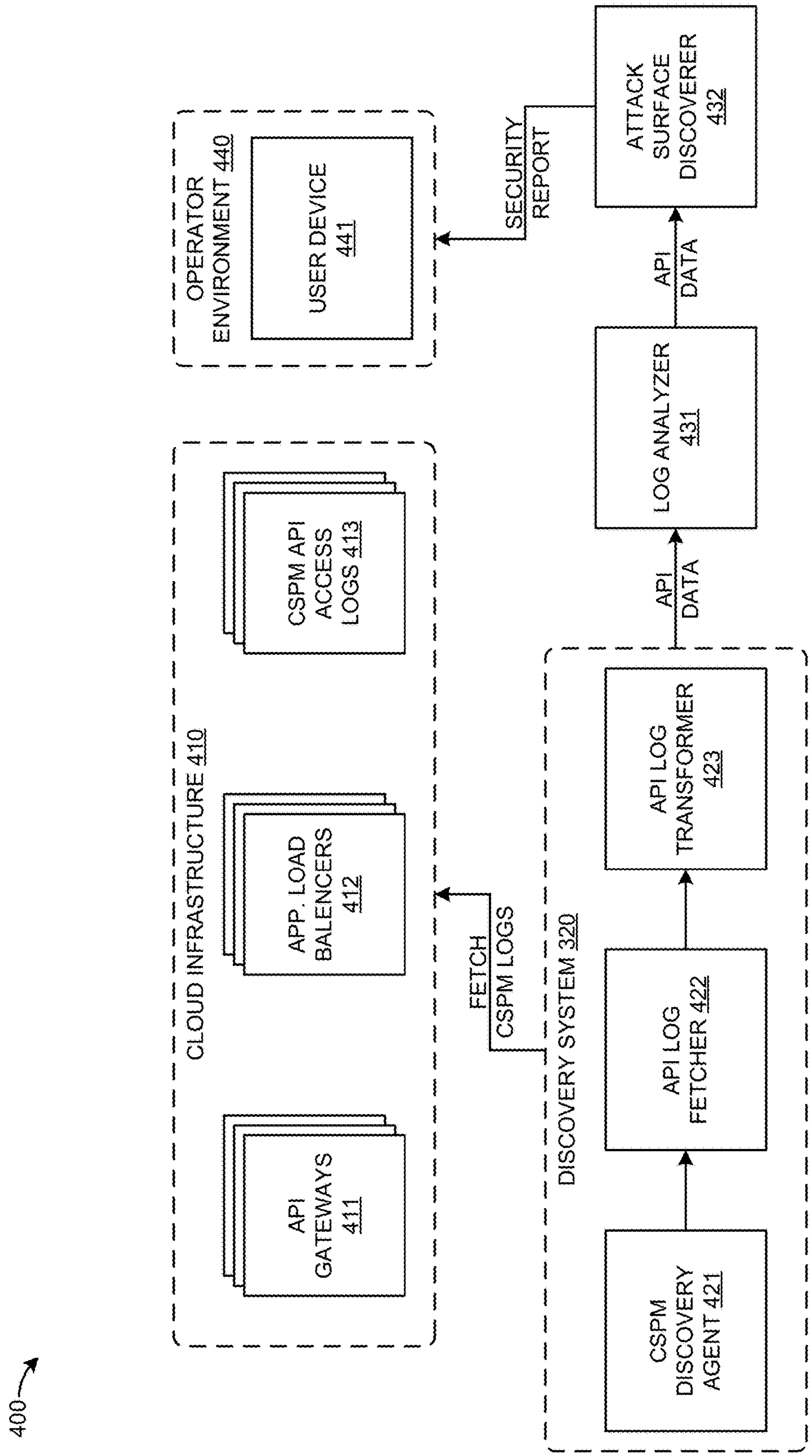
FIG. 4 illustrates another exemplary system to discover API attack vectors based on Cloud Security Posture Management (CSPM).

FIG. 4 illustrates API attack vector detection system 400 to discover API attack vectors based on CSPM. System 400 comprises cloud infrastructure 410, discovery system 420, log analyzer 431, attack surface discoverer 432, and operator environment 440. Cloud infrastructure 410 comprises API gateways 411, application (APP.) load balancers 412, and CSPM API access logs 413. Discovery system 420 comprises CSPM discovery agent 421, API log fetcher 422, and API log transformer 423. Operator environment 440 comprises user device 441. The process illustrated in FIG. 4 (performed by system 400) may be implemented in program instructions in the context of any of the software applications, module components, or other such elements of one or more computing devices.

In some examples, CSPM discovery agent 421 interacts with cloud infrastructure 410 to discover CSPM entities present in infrastructure 410. In particular, CSPM discovery agent 421 identifies CSPM entities that track access to APIs associated with cloud infrastructure 410. CSPM discovery agent 421 indicates the network addresses of API gateways 411, load balancers 412, and CSPM API access logs 413 to API log fetcher 422. API log fetcher 422 uses the network addresses for the CSPM agents to retrieve API traffic logs for APIs in cloud infrastructure 410 from API gateways 411, load balancers 412, and CSPM API access logs 413. The API traffic logs provide details on APIs being accessed, access methods (e.g., API call types), API endpoints, API responses, and the like. API log fetcher 422 indicates the retrieve traffic logs to API log transformer 423. Log transformer 423 processes the logs to discover the APIs in cloud infrastructure 410. For example, log transformer 423 may parse the API traffic logs to format the data for ingestion by log analyzer 431. Log transformer 423 transfers the processed API traffic logs to log analyzer 431.

Log analyzer 431 detects documented APIs associated in cloud infrastructure 410 based on the API traffic logs. Log analyzer 431 detects API names, addresses, endpoints, request types, response types, and the like. Log analyzer 431 infers the existence of additional APIs based on the APIs discovered in the traffic logs. Log analyzer 431 may utilize machine learning or API discovery heuristics (e.g., API type associations) to infer the existence of the additional APIs. For example, analyzer 431 may infer the existence of an API in cloud 410 based on an association between the API's type and another type of API that is documented in the CSPM data. Log analyzer 431 utilizes fuzzing techniques to discover undocumented APIs associated with cloud infrastructure 410. For example, log analyzer 431 may transfer API calls to endpoints that should not exist and discovers hidden APIs when analyzer 431 receives a response to these requests. Log analyzer 431 builds out an API catalog based on the discovered APIs and transfers the catalog to attack surface discoverer 432.

Attack surface discoverer 432 transfers API calls to each of the APIs identified in the catalog to verify their existence. Attack surface discoverer 432 generates API tests based on the traffic logs to determine security vulnerabilities in the discovered APIs. The API tests comprise malicious API requests intended to drive the API behave erroneously. For example, the API requests may attempt to access sensitive data using invalid security credentials, utilize faulty keys, access unavailable endpoints, perform unauthorized actions, and the like. Exemplary context-based API tests include broken object level authorization, broken user authentication, excessive data exposure, lack or resources and rate limiting, broken function level authorization, mass assignment, security misconfiguration, injection, improper assets management, and insufficient logging and monitoring. Attack surface discoverer 432 transfers the malicious requests to the cataloged APIs to conduct the API tests. Attack surface discoverer 432 receives and catalogues the API responses received in response to the requests and determines which of the responses resulted in erroneous behavior in the APIs. Attack surface discoverer 432 generates test results (e.g., a security/threat report) that indicate the cataloged APIs, highlights the unmanaged hidden APIs, and any detected security vulnerabilities from the tests. Attack surface discoverer 432 transfers the test results for display on user device 441. User device 441 generates a user interface that displays the test results for review by operators associated with cloud 410.

Figure 5:
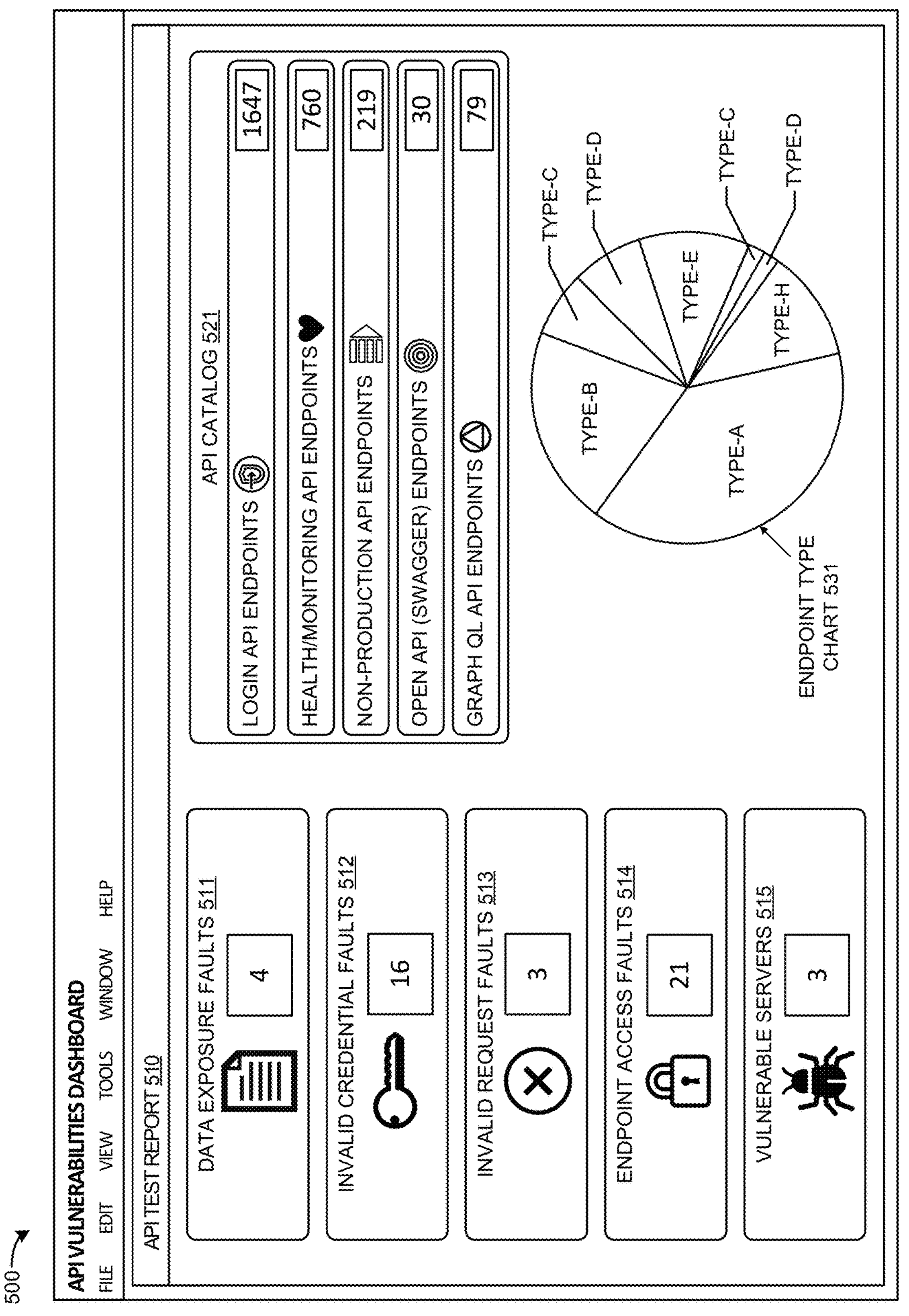
FIG. 5 illustrates an exemplary user interface.

FIG. 5 illustrates user interface 500 to indicate cataloged APIs and API attack vectors. For example, communication network 101 may implement process 200 to generate user interface 500 illustrated in FIG. 5. In other examples, user interface 500 may differ. User interface 500 may be displayed on devices like a user computer, tablet computer, smartphone, and the like. User interface 500 comprises a Graphical User Interface (GUI) configured to allow a user to view API test report 510. The GUI provides visualizations to indicate security vulnerabilities detected in one or more APIs based on API testing. In other examples, the GUI of user interface 500 may differ.

User interface 500 comprises API test report 510. For example, user interface 500 may present a selectable option that, in response to user action, drives user interface 500 to display API test report 510. In some examples, the computing device displaying user interface 500 may receive a hyperlink (e.g., via email) that links to API test report 510. User interface 500 may present the hyperlink on the display system of the computing device. A user may select the hyperlink which drives the computing device to download and display API test report 510 on interface 500 for review by a user.

API test report 510 comprises visual indicators 511-515, API catalog 521, and endpoint type chart 531. Visual indicators 511-515 characterize security vulnerabilities uncovered as a result of CSPM based API attack vector discovery and testing. In this example, indicators 511-515 comprise data exposure faults 511, invalid credential faults 512, invalid request faults 513, endpoint access faults 514, and vulnerable servers 515. Each of indicators 511-515 indicate the type and number of API faults/security threats detected during the API testing. In other examples, API test report 510 may comprise different, fewer, or additional visual indicators to categorize identified API security vulnerabilities. API catalog 521 identifies API endpoints for an organization by type and by number. In this example, the endpoint types comprise login API endpoints, health/monitoring API endpoints, non-production API endpoints, open API (swagger) endpoints, and graph QL API endpoints. The endpoint types and numbers included in API catalog 521 are exemplary and may differ in other examples. Server chart 531 comprises a pie chart to categorize the proportion of API server endpoints by type. In this example, endpoint type chart 531 categorizes endpoints of type-A to type-H. In other examples, chart 531 may differ.

Figure 6:
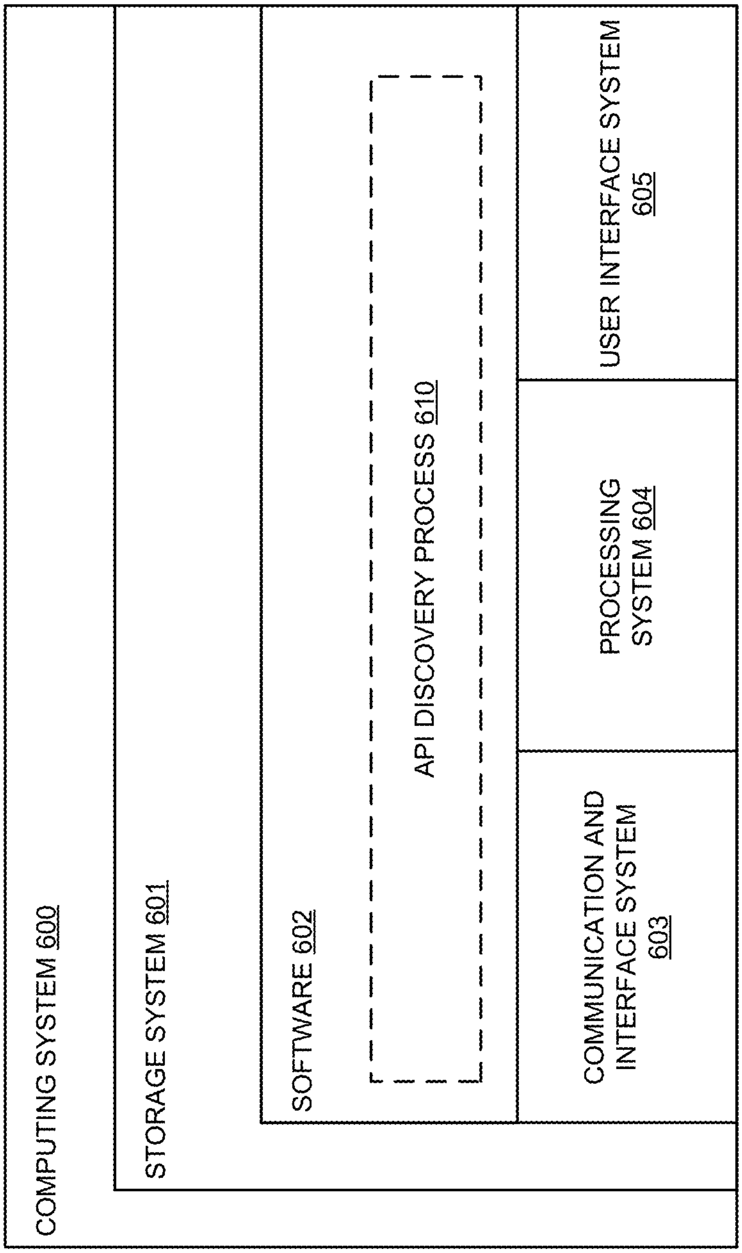
FIG. 6 illustrates an exemplary computing system.

FIG. 6 illustrates computing device 600 which is representative of any system or collection of systems in which the various processes, programs, services, and scenarios disclosed herein to discover APIs and detect security threats for the APIs. For example, computing device 600 may be representative of cloud infrastructure 101, data center 111, user systems 121, discovery system 420, log analyzer 431, cloud infrastructure 410, attack surface discovery 332, user device 341, and/or any other computing device contemplated herein. Examples of computing system 600 include, but are not limited to, server computers, routers, web servers, cloud computing platforms, and data center equipment, as well as any other type of physical or virtual server machine, physical or virtual router, container, and any variation or combination thereof.

Computing system 600 may be implemented as a single apparatus, system, or device or may be implemented in a distributed manner as multiple apparatuses, systems, or devices. Computing system 600 includes, but is not limited to, storage system 601, software 602, communication and interface system 603, processing system 604, and user interface system 605. Processing system 604 is operatively coupled with storage system 601, communication interface system 603, and user interface system 605.

Processing system 604 loads and executes software 602 from storage system 601. Software 602 includes and implements API discovery process 610, which is representative of the processes to generate API tests to determine security vulnerabilities in an API as described in the preceding Figures. For example, API discovery process 610 may be representative of process 200 illustrated in FIG. 2. When executed by processing system 604, software 602 directs processing system 604 to operate as described herein for at least the various processes, operational scenarios, and sequences discussed in the foregoing implementations. Computing system 600 may optionally include additional devices, features, or functionality not discussed here for purposes of brevity.

Processing system 604 may comprise a micro-processor and other circuitry that retrieves and executes software 602 from storage system 601. Processing system 604 may be implemented within a single processing device but may also be distributed across multiple processing devices or sub-systems that cooperate in executing program instructions. Examples of processing system 604 include general purpose central processing units, graphical processing units, application specific processors, and logic devices, as well as any other type of processing device, combinations, or variations thereof.

Storage system 601 may comprise any computer readable storage media that is readable by processing system 604 and capable of storing software 602. Storage system 601 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 601 may also include computer readable communication media over which at least some of software 602 may be communicated internally or externally. Storage system 601 may be implemented as a single storage device but may also be implemented across multiple storage devices or sub-systems co-located or distributed relative to each other. Storage system 601 may comprise additional elements, such as a controller capable of communicating with processing system 604 or possibly other systems.

Software 602 (API discovery process 610) may be implemented in program instructions and among other functions may, when executed by processing system 604, direct processing system 604 to operate as described with respect to the various operational scenarios, sequences, and processes illustrated herein. For example, software 602 may include program instructions for retrieving CSPM API logs to generate to discover an organization's APIs without requiring software deployment in the organization as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 602 may include additional processes, programs, or components, such as operating system software, virtualization software, or other application software. Software 602 may also comprise firmware or some other form of machine-readable processing instructions executable by processing system 604.

In general, software 602 may, when loaded into processing system 604 and executed, transform a suitable apparatus, system, or device (of which computing system 600 is representative) overall from a general-purpose computing system into a special-purpose computing system customized to discover APIs and detect API attack surfaces as described herein. Indeed, encoding software 602 on storage system 601 may transform the physical structure of storage system 601. The specific transformation of the physical structure may depend on various factors in different implementations of this description. Examples of such factors may include, but are not limited to, the technology used to implement the storage media of storage system 601 and whether the computer-storage media are characterized as primary or secondary storage, as well as other factors.

For example, if the computer readable storage media are implemented as semiconductor-based memory, software 602 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 603 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 600 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices to discover APIs and detect security vulnerabilities in the discovered APIs, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to discover hidden Application Programming Interfaces (APIs) and detect security vulnerabilities in the hidden APIs, the method comprising:

accessing Cloud Security Posture Management (CSPM) logs;

discovering APIs based on the CSPM logs;

identifying additional APIs that are not present in the CSPM logs;

making API calls using modified addresses for the APIs and the additional APIs, wherein the modified addresses are not referenced in the CSPM logs or an open API specification, and discovering the hidden APIs based on receiving responses to the API calls; and testing discovered APIs to determine attack surfaces, wherein the discovered APIs comprise the APIs, the additional APIs, and the hidden APIs.

2. The method of claim 1 further comprising generating a report that identifies the discovered APIs and that indicates the attack surfaces.

3. The method of claim 1 wherein identifying the additional APIs that are not present in the CSPM logs comprises inferring that the additional APIs exist based on an association with the APIs identified in the CSPM logs.

4. The method of claim 1 wherein accessing the CSPM logs comprises:

obtaining CSPM log credentials;

utilizing the CSPM log credentials to transfer CSPM log requests to one or more of an API gateway, load balancer, or API access log to retrieve the CSPM logs; and receiving the CSPM logs from the one or more of the API gateway, load balancer, or API access log.

5. The method of claim 1 wherein:

the CSPM logs indicate historic calls to the APIs; and discovering the APIs based on the CSPM logs comprises discovering the APIs based on the historic calls to the APIs.

6. The method of claim 1 wherein identifying the additional APIs that are not present in the CSPM logs comprises:

identifying ancillary API endpoints based on the open API specification associated with the APIs;

pinging the ancillary API endpoints; and discovering the additional APIs based on ones of the ancillary API endpoints that responded to the pinging.

7. The method of claim 1 wherein transferring the API calls using modified addresses for the APIs and the additional APIs comprises:

addressing the API calls for API endpoints not referenced in the CSPM logs or the open API specification associated with the APIs;

transferring the API calls to the API endpoints; and discovering the hidden APIs based on ones of the API endpoints that responded to the API calls.

8. The method of claim 1 wherein testing the discovered APIs to determine the attack surfaces comprises:

generating improper API calls that comprise attributes that are not present in expected API calls for the discovered APIs;

transferring the improper API calls to the discovered APIs to attempt to drive the discovered APIs to perform unauthorized actions; and determining the attack surfaces based on ones of the discovered APIs that implemented the improper API calls.

9. The method of claim 8 wherein the improper API calls comprise one or more of additional fields, request types not aligned with API types, or invalid security credentials.

10. A system to discover hidden Application Programming Interfaces (APIs) and detect security vulnerabilities in the hidden APIs, the system comprising:

processing circuitry configured to host a Cloud Security Posture Management (CSPM) discovery agent, an API log analyzer, and an attack surface discovery module;

the CSPM discovery agent configured to:

access CSPM logs; and the API log analyzer configured to:

discover APIs based on the CSPM logs;

identify additional APIs that are not present in the CSPM logs; and initiate API calls using modified addresses for the APIs and the additional APIs, wherein the modified addresses are not referenced in the CSPM logs or an open API specification, and discover the hidden APIs based on responses received to the API calls; and the attack surface discovery module configured to:

test discovered APIs to determine attack surfaces in the discovered APIs, wherein the discovered APIs comprise the APIs, the additional APIs, and the hidden APIs.

11. The system of claim 10 wherein the attack surface discovery module is further configured to generate a report that identifies the discovered APIs and that indicates the attack surfaces.

12. The system of claim 10 wherein the API log analyzer is configured to infer that the additional APIs exist based on an association with the APIs identified in the CSPM logs.

13. The system of claim 10 wherein the CSPM discovery agent is configured to:

obtain CSPM log credentials; and utilize the CSPM log credentials to transfer CSPM log requests to one or more of an API gateway, load balancer, or API access log to retrieve the CSPM logs; and receive the CSPM logs from the one or more of the API gateway, load balancer, or API access log.

14. The system of claim 10 wherein:

the CSPM logs indicate historic calls to the APIs; and the API log analyzer is configured to discover the APIs based on the based on the historic calls to the APIs.

15. The system of claim 10 wherein the API log analyzer is configured to:

identify ancillary API endpoints based on the open API specification associated with the APIs;

ping the ancillary API endpoints; and discover the additional APIs based on ones of the ancillary API endpoints that responded to the pinging.

16. The system of claim 10 wherein the API log analyzer is configured to:

address the API calls for API endpoints not referenced in the CSPM logs or the open API specification associated with the APIs;

transfer the API calls to the API endpoints; and discover the hidden APIs based on ones of the API endpoints that responded to the API calls.

17. The system of claim 10 wherein the attack surface discovery module is configured to:

generate improper API calls that comprise attributes that are not present in expected API calls for the discovered APIs, the attributes comprising one or more of additional fields, request types not aligned with API types, or invalid security credentials;

transfer the improper API calls to the discovered APIs to attempt to drive the discovered APIs to perform unauthorized actions; and determine the attack surfaces based on ones of the discovered APIs that implemented the improper API calls.

18. The system of claim 10 further comprising computing circuitry configured to execute the CSPM discover agent, the API log analyzer, and the attack surface discovery module.

19. One or more non-transitory computer-readable storage media having program instructions stored thereon to discover hidden Application Programming Interfaces (APIs) and detect security vulnerabilities in the hidden APIs, wherein the program instructions, when executed by a computing system, direct the computing system to perform operations, the operations comprising:

accessing Cloud Security Posture Management (CSPM) logs;

discovering APIs based on the CSPM logs;

identifying additional APIs that are not present in the CSPM logs;

making API calls using modified addresses for the APIs and the additional APIs, wherein the modified addresses are not referenced in the CSPM logs or an open API specification, and discovering the hidden APIs based on receiving responses to the API calls; and testing discovered APIs to determine attack surfaces, wherein the discovered APIs comprise the APIs, the additional APIs, and the hidden APIs.

20. The computer-readable storage media of claim 19 wherein the operations further comprise:

generating a report that identifies the discovered APIs and that indicates the attack surfaces; and wherein:

identifying the additional APIs that are not present in the CSPM logs comprises inferring that the additional APIs exist based on an association with the APIs identified in the CSPM logs.

* * * * *